US012637803B2

(12) United States Patent
Chen et al.

(10) Patent No.: US 12,637,803 B2
(45) Date of Patent: May 26, 2026

(54) COMPOSITE STRUCTURE, RESIN FILM, AND METHOD OF MANUFACTURING RESIN FILM

(71) Applicant: G-FUN INDUSTRIAL CORPORATION, Taoyuan City (TW)

(72) Inventors: Kuo-Chin Chen, Taoyuan City (TW); Chiu-Hsiung Tsai, Taoyuan City (TW); Chun-Jen Niu, Taoyuan City (TW); Li-Hsun Chang, Taoyuan City (TW)

(73) Assignee: G-FUN INDUSTRIAL CORPORATION, Taoyuan City (TW)

( * ) Notice: Subject to any disclaimer, the term of this patent is extended or adjusted under 35 U.S.C. 154(b) by 163 days.

(21) Appl. No.: 17/869,308

(22) Filed: Jul. 20, 2022

(65) Prior Publication Data

US 2023/0235504 A1 Jul. 27, 2023

(30) Foreign Application Priority Data

Jan. 25, 2022 (TW) .................................. 111103040

(51) Int. Cl.
*D06N 3/18* (2006.01)
*C08J 5/18* (2006.01)
(Continued)

(52) U.S. Cl.
CPC ................ *D06N 3/183* (2013.01); *C08J 5/18* (2013.01); *D06N 3/0006* (2013.01); *D06N 3/0034* (2013.01); *D06N 3/0036* (2013.01); *D06N 3/0059* (2013.01); *D06N 3/0095* (2013.01); *D06N 3/047* (2013.01); *D06N 3/128* (2013.01);
(Continued)

(58) Field of Classification Search
CPC .... D06N 3/183; D06N 3/0006; D06N 3/0034; D06N 3/0036; D06N 3/0059; D06N 3/0095; D06N 3/047; D06N 3/128; D06N 2201/0263; D06N 2203/044; D06N 2203/066; D06N 2209/128; D06N 2209/1664; D06N 3/0052; D06N 3/14; C08J 5/18; C08J 2375/04
See application file for complete search history.

(56) References Cited

U.S. PATENT DOCUMENTS 10,563,063 B2 2/2020 Tsuchida

FOREIGN PATENT DOCUMENTS

| CN | 104479337 B | 7/2020 |
| CN | 107429145 B | 6/2021 |
| JP | 5593011 B2 | 9/2014 |

OTHER PUBLICATIONS ip.com english translation for Suzsuma et al (JP 2010084252 A) (Year: 2010).*

(Continued)

*Primary Examiner* — Nathan L Van Sell
(74) *Attorney, Agent, or Firm* — Li & Cai Intellectual Property (USA) Office

(57) ABSTRACT

A composite structure, a resin film, and a method of manufacturing the resin film are provided. The composite structure includes a release carrier and a resin film. The release carrier includes a release substrate and a release resin layer that is formed on the release substrate. The release resin layer covers the release substrate at a coverage rate of between 60% and 100%. The resin film is formed on the release carrier. The resin film is bonded to each of the release substrate and the release resin layer.

5 Claims, 4 Drawing Sheets

<u>S</u>

(51) Int. Cl.
    *D06N 3/00*         (2006.01)
    *D06N 3/04*         (2006.01)
    *D06N 3/12*         (2006.01)

(52) U.S. Cl.
    CPC ... *C08J 2375/04* (2013.01); *D06N 2201/0263*
        (2013.01); *D06N 2203/044* (2013.01); *D06N*
            *2203/066* (2013.01); *D06N 2209/128*
                (2013.01)

(56)                References Cited

OTHER PUBLICATIONS

English Translation for Wu et al (CN 106009879 A) (Year: 2016).*
English Translation for Wang et al (CN 113604088 A) (Year: 2021).*
Sewport Support Team, What is Taffeta Fabric: Properties, How its Made and Where (Year: 2021).*
Air Permeability Conversion Factors—IDFL (Year: 2024).*
English translation for Teng et al (CN 110358376 A) (Year: 2019).*

\* cited by examiner

S

1

COMPOSITE STRUCTURE, RESIN FILM, AND METHOD OF MANUFACTURING RESIN FILM

CROSS-REFERENCE TO RELATED PATENT APPLICATION

This application claims the benefit of priority to Taiwan Patent Application No. 111103040, filed on Jan. 25, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a composite structure, a resin film, and a method of manufacturing the resin film, and more particularly to a composite structure for manufacturing a waterproof and moisture-permeable film.

BACKGROUND OF THE DISCLOSURE

A conventional waterproof and moisture-permeable fabric can be manufactured by bonding a waterproof and moisture-permeable film to a fabric layer. Preparation of the waterproof and moisture-permeable film conventionally includes a thermoplastic process and a release process. The thermoplastic process can be a blown film process or a casting process. In the release process, a thin film layer is formed on a release carrier by a dry process or a wet process, and then the release carrier is removed to obtain the waterproof and moisture-permeable film.

Specifically, the release carrier technology in the wet process is widely applied to a base of a self-adhesive and a base of a protective film. A release paper is used in the conventional technology for production of the waterproof and moisture-permeable film. A common kraft paper, a wood-free printing paper, a translucent paper, or a transparent paper can be used as a substrate, and then a release agent is added onto the substrate, so as to obtain the release paper.

However, the release paper conventionally has a low temperature tolerance and cannot be dried at a high temperature during a production process. A solvent residue is about 300 ppm or more, and a complete evaporation of which is not easy. As such, a resin film prepared by using the release paper has a wet tactile sensation.

Therefore, how to provide the release carrier through an improvement in formula design and improve the production process of the waterproof and moisture-permeable film, so as to overcome the above-mentioned deficiencies, has become one the important issues to be addressed in the related field.

SUMMARY OF THE DISCLOSURE

In response to the above-referenced technical inadequacies, the present disclosure provides a composite structure, a resin film, and a method of manufacturing the resin film.

In one aspect, the present disclosure provides a composite structure, which includes a release carrier and a resin film. The release carrier includes a release substrate and a release resin layer. The release resin layer is formed on the release substrate, and the release resin layer covers the release substrate at a coverage rate between 60% and 100%. An air permeability of the release carrier is between 0 cfm and 15 cfm (according to the American Society for Testing and Materials (ASTM) D737 test standard). The resin film is formed on the release carrier, and the resin film is bonded to each of the release substrate and the release resin layer.

In another aspect, the present disclosure provides a method of manufacturing a resin film, which includes the following steps: (a) providing a release substrate; (b) forming a release resin layer on the release substrate to obtain a release carrier, in which the release resin layer covers the release substrate at a coverage rate between 60% and 100%, and an air permeability of the release carrier is between 0 cfm and 15 cfm (according to the American Society for Testing and Materials (ASTM) D737 test standard); (c) forming a resin film on the release resin layer of the release carrier by a dry process or a wet process to obtain a composite structure, in which the resin film is bonded to each of the release substrate and the release resin layer; and (d) peeling off the release carrier from the composite structure to obtain the resin film, in which the composite structure has a peeling strength of 0.1 kgf/inch to 0.8 kgf/inch (according to the American Society for Testing and Materials (ASTM) K6404-5 test standard).

In detail, for the resin film manufactured by the dry process, the release resin layer covers the release substrate at a coverage rate of between 70% and 100%. More specifically, the release resin layer of the release carrier that is used in the resin film manufactured by the dry process covers the release substrate at the coverage rate of between 70% and 100%. Similarly, for the resin film manufactured by the wet process, the release resin layer covers the release substrate at a coverage rate of between 60% and 90%.

In yet another aspect, the present disclosure provides a resin film which is manufactured by the method of the present disclosure, so as to overcome the issue that a high amount of solvent residue is produced when a release paper is used in the dry process. The solvent residue of the resin film manufactured by the method of the present disclosure is less than 200 ppm.

Therefore, in the composite structure, the resin film, and the method of manufacturing the resin film provided by the present disclosure, by virtue of the release resin layer covering the release substrate at the coverage rate of between 60% and 100%, and the resin film formed on the release carrier being bonded to each of the release substrate and the release resin layer, a manufacturing temperature of the resin film can be improved and a solvent residue problem can be reduced. Further, the resin film thus obtained can provide a tactile sensation that is dry and powdery, and can have a higher degree of elongation and haze.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
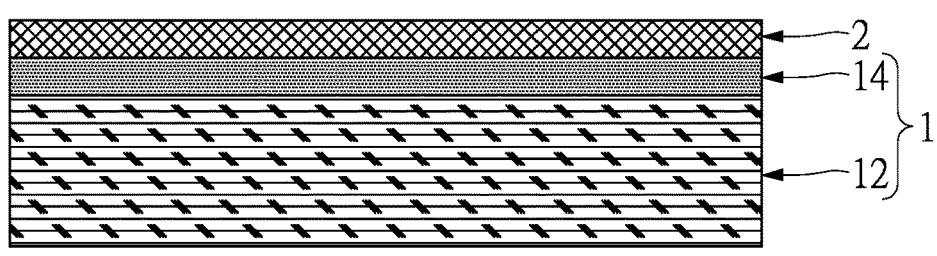
FIG. 1 is a schematic cross-sectional view of a composite structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, in which a composite structure of the present disclosure is shown. The composite structure of the present disclosure includes a release carrier 1 and a resin film 2. The resin film 2 is formed on the release carrier 1. The release carrier 1 includes a release substrate 12 and a release resin layer 14. The release resin layer 14 is formed on the release substrate 12, and the release resin layer 14 covers the release substrate 12 at a coverage rate of between 60% and 100%. The resin film 2 is bonded to each of the release substrate 12 and the release resin layer 14.

In one particular embodiment of the present disclosure, the resin film 2 is a waterproof and moisture-permeable film.

Preferably, based on a total weight of the release resin layer 14, a material of the release resin layer 14 includes 30 wt % to 80 wt % of silicone resin or fluorocarbon resin, 1 wt % to 20 wt % of a catalyst, and 10 wt % to 35 wt % of an organic solvent. Preferably, the organic solvent is butanone and/or toluene.

Specifically, in 30 wt % to 80 wt % of the silicone resin or the fluorocarbon resin, the silicone resin is selected from a group consisting of organopolysiloxane, polydimethylsiloxane with functional groups, and an organopolysiloxane mixture. More specifically, the organopolysiloxane can be polydimethylsiloxane having an end group replaced by a vinyl group or a hexenyl group, and an organopolysiloxane compound can be copolymerized with polyesters, polyacrylate, polyvinyl alcohol (PVA), polyvinyl chloride, styrene-butadiene rubber, etc. The fluorocarbon resin is selected from a group consisting of polytetrafluorethylene (PTFE), polyperfluoropropylene (fluorinated ethylene propylene, FEP) polymers and copolymers thereof.

The catalyst can be at least one selected from a group consisting of methylcyclohexane (MCH), alkoxysilane, alkoxysiloxane, polydimethylsiloxane with functional groups, and an ester catalyzer. However, the aforementioned details are disclosed for exemplary purposes only, and are not meant to limit the scope of the present disclosure.

Figure 2:
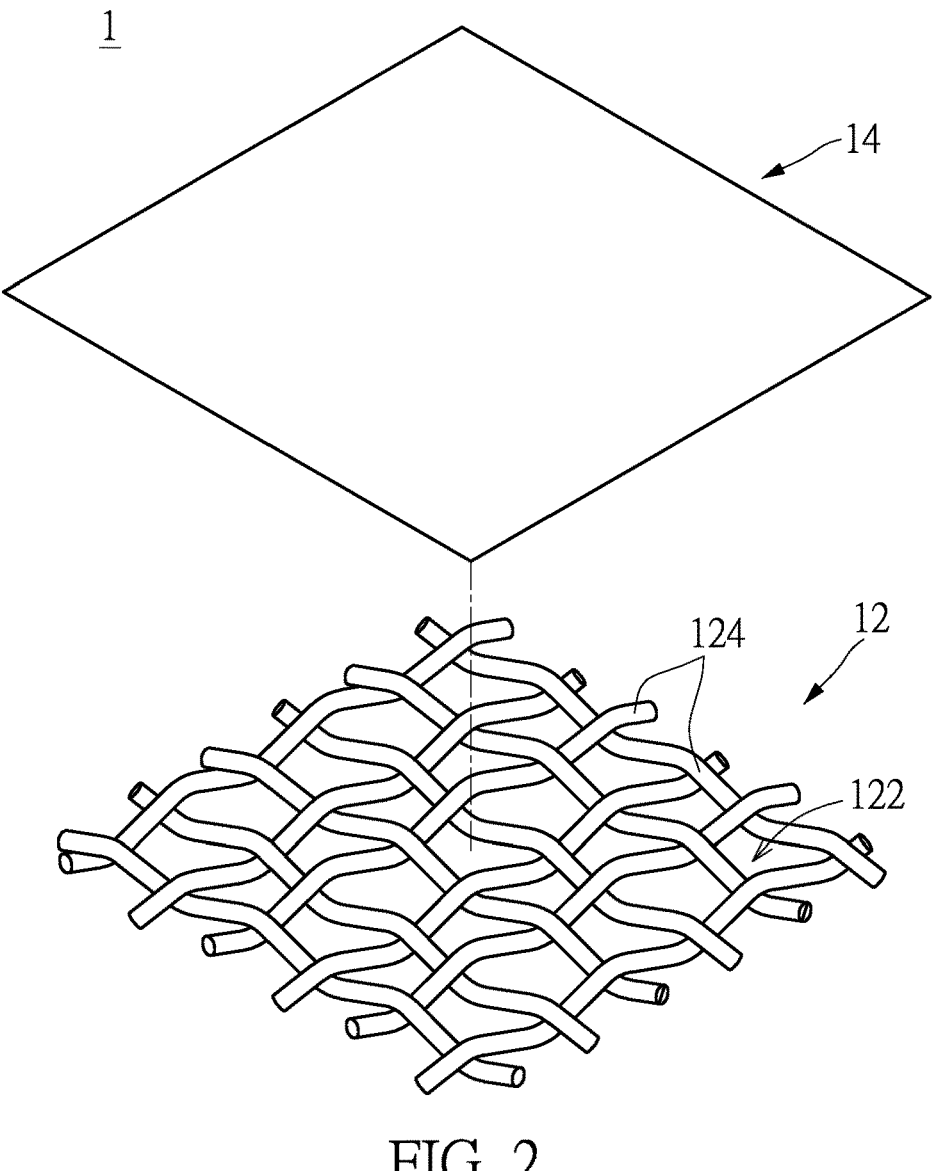
FIG. 2 is a schematic exploded view of a release carrier according to the present disclosure.
Figure 3:
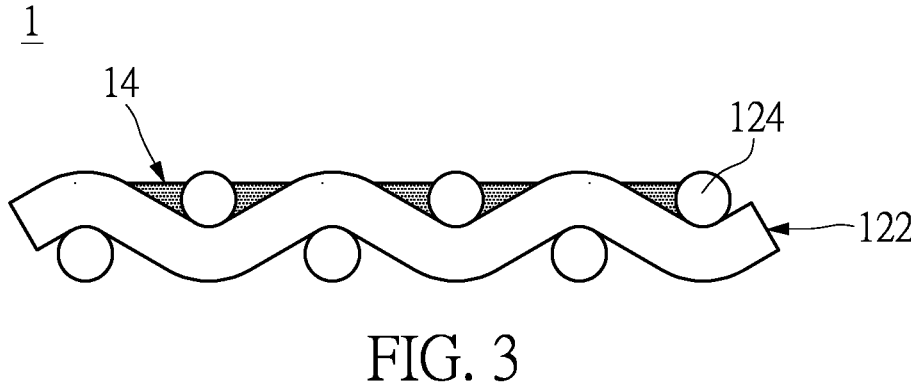
FIG. 3 is an enlarged cross-sectional view of the release carrier according to the present disclosure.
Figure 4:
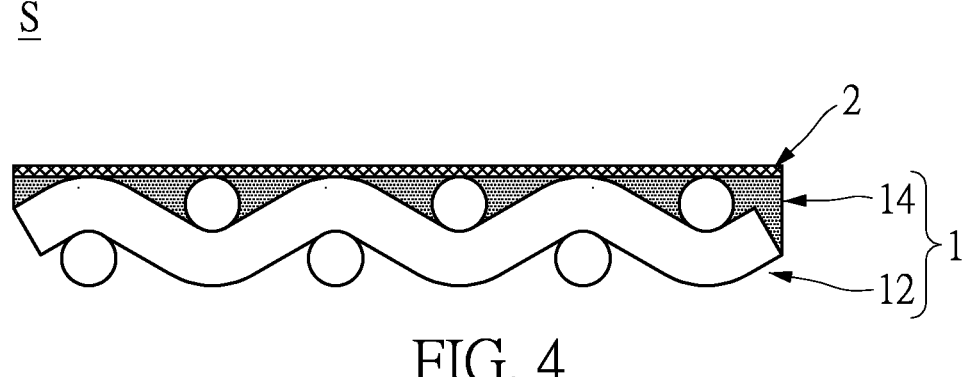
FIG. 4 is an enlarged cross-sectional view of the composite structure according to the present disclosure.

Referring to FIG. 2 to FIG. 4, a release carrier of the present disclosure is suitable for preparation of a resin film. As shown in FIG. 2 and FIG. 3, the release carrier 1 includes the release substrate 12 and the release film layer 14. The release resin layer 14 is disposed on the release substrate 12, and a surface of the release substrate 12 is partially exposed. More specifically, the release substrate 12 has a plurality of concave parts 122 and a plurality of convex parts 124, and the release resin layer 14 is correspondingly arranged in the plurality of concave parts 122, so that the plurality of convex parts 124 are exposed.

Reference is made to FIG. 4, in which a schematic cross-sectional view of the composite structure according to another embodiment of the present disclosure is shown. The composite structure includes the release carrier 1 and the resin film 2. The release carrier 1 includes the release substrate 12 and the release resin layer 14 that is correspondingly arranged in the plurality of concave parts 122 of the release substrate 12. Accordingly, when the resin film 2 is formed on the release carrier 1, the resin film 2 is bonded to each of the release substrate 12 and the release resin layer 14.

Further, a material of the release substrate 12 can be a natural fiber, an artificial fiber, or a blended fiber. The natural fiber can be a variety of plant fibers or animal fibers, such as cotton, linen, wool, and silk. The artificial fiber can be a variety of polymer synthetic fibers, such a polyester fiber, a polyamide fiber (i.e., nylon), a polypropylene fiber, an acrylic fiber, and an elastic fiber. The blended fiber can be, for example, woven from at least two of the above-mentioned different types of fibers. Preferably, the release substrate 12 is a nylon fabric, a blended fabric, or a polyester fabric.

Figure 5:
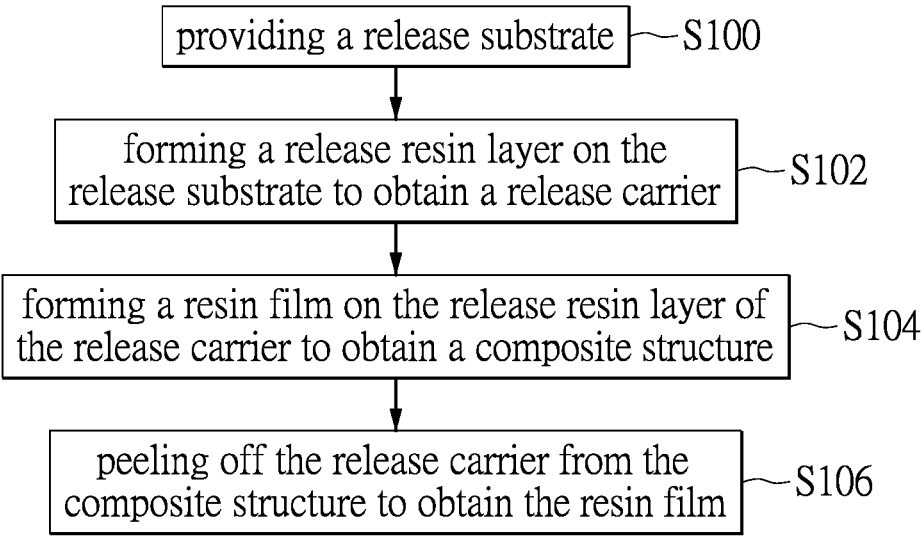
FIG. 5 is a flowchart of a method of manufacturing a resin film according to the present disclosure.

Referring to FIG. 5, the present disclosure further provides a method of manufacturing a resin film. The method includes the following steps: providing a release substrate (step S100); forming a release resin layer on the release substrate to obtain a release carrier (step S102); forming a resin film on the release resin layer of the release carrier to obtain a composite structure (step S104); and peeling off the release carrier from the composite structure to obtain the resin film (step S106). Specifically, the materials of the release substrate and the release resin layer are as described above.

Figure 6:
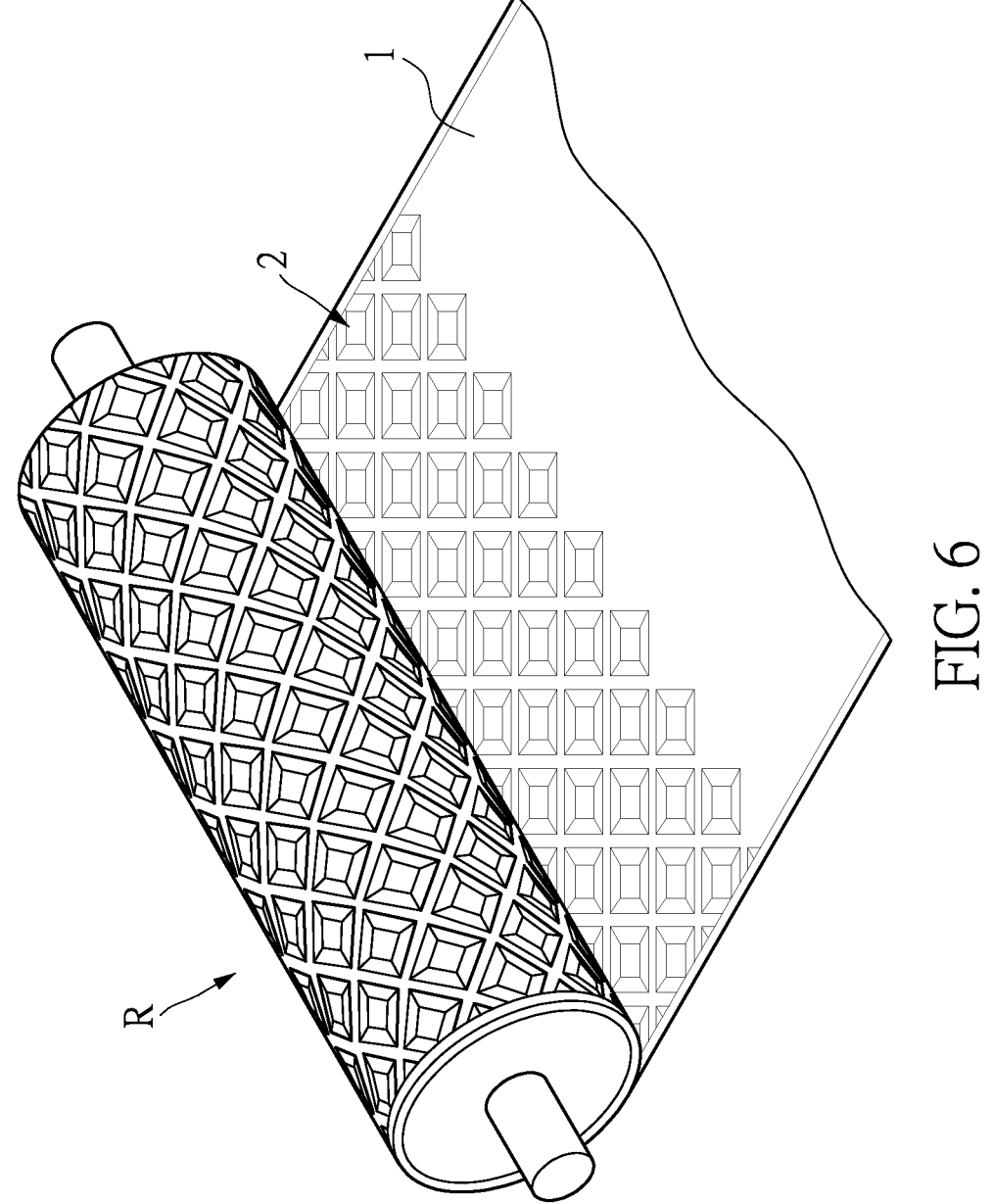
FIG. 6 is a schematic view showing step S102 of the method of manufacturing the resin film according to the present disclosure.

The step S102 of forming the release resin layer on the release substrate can have different ways of implementation. For example, one implementation of the present disclosure is as shown in FIG. 6. In the step S102, the material of the release resin layer is transferred to the release substrate through a transfer roller R with a cross pattern, so that the release resin layer with a mesh pattern can be obtained. A surface of the release substrate is partially exposed through the mesh pattern. A texture and a texture density of the transfer roller R can be adjusted according to practical requirements. The texture density of the transfer roller R is preferably 60 mesh to 200 mesh, and is more preferably 80 mesh to 120 mesh.

In the step S102, the release resin layer can be formed by scraper coating according to another implementation of the present disclosure. A scraper coating process allows a thickness of the release resin layer 14 to be as thin as a thickness of the release substrate 12, such that the release resin layer 14 is correspondingly arranged between the concave parts 122 of the release substrate 12.

According to the practical requirements, after the release resin layer 14 is transferred to or coated onto the release substrate 12, a solvent can be removed by drying through the use of an oven and the release resin layer 14 is allowed to undergo a cross-linking reaction. When a dry process is performed, the release resin layer 14 is dried in the oven, so as to remove the solvent.

In addition, a process of homogeneous mixing can be further included in the step S102. The material of the release resin layer is sufficiently mixed to form a paste material with a viscosity between 2000 centipoise and 10000 centipoise, so that the release resin layer has a better viscosity. Then, the paste material (i.e., the material of the release resin layer) is transferred to or coated onto the release substrate 12, so as to form the release resin layer 14.

Further, the step S104 of forming the resin film includes the dry process and a wet process. In the dry process, the release carrier is spread and transferred through a roller, and the material of the resin film is coated onto the release carrier by injection. Then, the material of the resin film is evenly distributed on the release carrier by use of a scraper, and a required thickness is set. After processes of drying and crosslinking, a dry process product is obtained. In the wet process, the material of the resin film is coated onto the release carrier and is then immersed in a replacement tank containing an aqueous solution of dimethylformamide (DMF) solvent, so that the DMF solvent in the material of the resin film is replaced by the aqueous solution and a microporous film with a moisture-permeable property is formed. After the processes of drying and crosslinking, a wet process product is obtained.

More specifically, the material of the resin film includes a main resin and an auxiliary agent. In one particular embodiment, the main resin is polyurethane (PU), and the auxiliary agent is selected from polyolefin resin, cycloolefin polymer (COP) or cycloolefin copolymer (COC), a crosslinking agent, a UV absorber, or an antioxidant additive. Preferably, the auxiliary agent is COP or COC. In addition, the material of the resin film can further include a solvent, which can be selected from dimethylformamide (DMF), methyl ethyl ketone (MEK), toluene (TOL), isopropanol (IPA), ethyl acetate (EAC), etc.

The present disclosure further provides a resin film which is manufactured by using the above-mentioned method. The solvent residue of the resin film is less than 200 ppm, and can be between 10 ppm and 200 ppm. Preferably, the solvent residue is between 30 ppm and 180 ppm. While the solvent residue in a conventional manufacturing process with use of the release paper is about 300 ppm or more, the resin film manufactured by the method of the present disclosure allows the solvent residue to be effectively reduced, thereby overcoming a solvent residue problem. Therefore, the resin film thus obtained can provide a tactile sensation that is dry and powdery, and can have a higher degree of elongation and haze.

However, the aforementioned details are disclosed for exemplary purposes only, and are not meant to limit the scope of the present disclosure.

EXAMPLES

The present disclosure is further illustrated with reference to Comparative example 1, Example 1, and Example 2. A commercially available release paper is used for preparing the resin film in Comparative example 1, and the release carrier (i.e., a release cloth) of the present disclosure is used in Example 1 and Example 2.

| Tested characteristics | | Comparative example 1 | Example 1 | Example 2 |
|---|---|---|---|---|
| Resin film | Film thickness (μm) | 15~30 | 12~30 (hydrophilic film) | 30~60 (micro-porous film) |
| | Tactile sensation | Slippery | Dry | Dry |
| | Tensile Strength of film (ASTM D882) (N/mm$^2$) (Tensile Strength) | 6~31 | 5~30 | 4~25 |
| | Elongation of film (ASTM D882) (%) (Elongation) | 100~300 | 80~300 | 200~350 |
| Peeling strength between carrier and film (JIS K6404-5)(Kgf/inch) | | 0.2~0.4 | 0.1~0.3 | 0.1~0.3 |
| Surface of release carrier(release surface) | Dyne value (dyne) | 30↓ | 30↓ | 30↓ |
| | Water contact angle (°) | 120~140 | 110~125 | 120~135 |
| Weight of silicone of release carrier (g/m$^2$) (cloth not included) | | — | 2~5 | 1~4 |
| Air permeability of release carrier (cfm) ASTM D737 | | 0 | 0~10 | 1~15 |
| DMF residue (ppm) ISO 16189 | | 378 | 48 | 46 |

Beneficial Effects of the Embodiments

In conclusion, one of the beneficial effects of the present disclosure is that, in the composite structure, the resin film, and the method of manufacturing the resin film provided by the present disclosure, by virtue of the release resin layer covering the release substrate at the coverage rate of between 60% and 100%, and the resin film formed on the release carrier being bonded to each of the release substrate and the release resin layer, a manufacturing temperature of the resin film can be improved and a solvent residue problem can be reduced. Further, the resin film thus obtained can provide the tactile sensation that is dry and powdery, and can have the higher degree of elongation and haze.

More specifically, for the resin film manufactured by the dry process, the release resin layer covers the release substrate at a coverage rate of between 70% and 100%. For the resin film manufactured by the wet process, the release resin layer covers the release substrate at a coverage rate of between 60% and 90%.

Further, in the conventional manufacturing process with use of the release paper, the solvent residue is about 300 ppm or more. However, the resin film manufactured by the method of the present disclosure allows the solvent residue to be decreased to 200 ppm or less, thereby overcoming the solvent residue problem. Therefore, the resin film thus obtained can provide the tactile sensation that is dry and powdery, and can have the higher degree of elongation and haze.

Through the release carrier of the present disclosure, one part of the resin film is in contact with the release substrate and another part of the resin film is in contact with the release resin layer, so that the release resin layer covers the release substrate at the coverage rate of between 60% and 100%. Therefore, a surface of the resin film can have adhesive and releasing properties of different materials, thereby achieving a better release effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A composite structure, comprising:
   a release carrier, wherein the release carrier includes:
   a release substrate; and
   a release resin layer formed on the release substrate, wherein the release resin layer covers the release substrate at a coverage rate of between 60% and 90%, wherein a material of the release resin layer includes silicone resin or fluorocarbon resin, and the release carrier contains 1 g/m² to 5 g/m² of the silicone resin or the fluorocarbon resin, wherein the release substrate has a plurality of concave parts and a plurality of convex parts, and the release resin layer is correspondingly arranged in the plurality of concave parts, so that the plurality of convex parts is exposed; and
   a resin film formed on the release carrier, wherein the resin film contacts both the release resin layer and the plurality of convex parts of the release substrate, and the resin film includes a resin and an agent, wherein the resin is polyurethane (PU), and the agent is selected form the group consisting of polyolefin resin, cycloolefin polymer (COP), cycloolefin copolymer (COC), a crosslinking agent, a UV absorber, and an antioxidant additive,
   wherein an air permeability of the release carrier is between 1 cfm and 15 cfm.

2. The composite structure according to claim 1, wherein the resin film is a waterproof and moisture-permeable film.

3. The composite structure according to claim 1, wherein, based on a total weight of the release resin layer, the material of the release resin layer includes 30 wt % to 80 wt % of the fluorocarbon resin, 1 wt % to 20 wt % of a catalyst, and 10 wt % to 35 wt % of at least one of butanone and toluene.

4. The composite structure according to claim 1, wherein the silicone resin is selected from a group consisting of organopolysiloxane, polydimethylsiloxane with functional groups, and an organopolysiloxane mixture; wherein the fluorocarbon resin is selected from a group consisting of polytetrafluorethylene (PTFE), polyperfluoropropylene (fluorinated ethylene propylene, FEP) polymers and copolymers thereof.

5. The composite structure according to claim 1, wherein a material of the release substrate is selected from a group consisting of a natural fiber, an artificial fiber, and a blended fiber; wherein the natural fiber is selected from a group consisting of cotton, linen, wool, and silk; wherein the artificial fiber is selected from a group consisting a polyester fiber, a polyamide fiber (nylon), a polypropylene fiber, an acrylic fiber, and an elastic fiber; wherein the blended fiber is woven from at least two of cotton, linen, wool, silk, a polyester fiber, a polyamide fiber (nylon), a polypropylene fiber, an acrylic fiber, and an elastic fiber.

\* \* \* \* \*